Patented June 9, 1953

2,641,616

UNITED STATES PATENT OFFICE 2,641,616

PURIFICATION OF CHEMICAL COMPOUNDS

Leo Philipp Ellinger, London, England, assignor to The British Oxygen Company Limited, London, England, a British company No Drawing. Application July 26, 1950, Serial No. 176,059. In Great Britain June 17, 1949

7 Claims. (Cl. 260—616)

The present invention relates to the purification of chemical compounds and more particularly to the purification of vinyl ethers produced by the vinylation of alcohols of the $C_4$—$C_8$ range.

In the vinylation of alcohols with acetylene in the presence of a suitable catalyst such as caustic potash, a crude product is obtained comprising a mixture of the alkyl vinyl ether formed with residual alcohol, together with small amounts of the corresponding dialkyl acetal and water. Distillation of this crude reaction product leads to the formation of azeotropes containing between 75 and 95% of the ether depending on the particular alcohol used, the remainder being largely residual alcohol together with small amounts of other products.

In the case of the lower alkyl vinyl ethers (i. e., those in which the alkyl group contains 4 or less carbon atoms) it has been proposed to remove the alcohol from the azeotrope by washing with water in which $C_1$—$C_3$ alcohols are completely soluble and the $C_4$ alcohols are appreciably soluble, whilst the corresponding alkyl vinyl ethers are substantially insoluble. Such a process cannot however be used for alcohols in the $C_5$—$C_8$ range, owing to their reduced water solubility which decreases rapidly with increasing molecular weight of the alcohol; its application is not really satisfactory even in the case of the $C_4$ alcohols where the solubility in water, though appreciable, is incomplete.

In order to extend this process to the $C_4$—$C_8$ alcohols, it is necessary to use a solvent other than water and one which must possess the following properties:

1. The solvent and alcohol must exert a large mutual solubility and preferably be completely miscible.

2. The solvent and the vinyl ether must possess very small mutual solubilities.

3. The partition of the alcohol between the vinyl ether and the scrubbing solvent must be such as to give higher concentrations of the alcohol in the scrubbing solvent.

4. The solvent must not react chemically with either the vinyl ether or the alcohol at room temperature or at its boiling point.

5. There should be an appreciable difference of specific gravity between the solvent and the vinyl ether to allow for ready separation of the two phases obtained on mixing.

6. It would be advantageous if complete recovery of dissolved alcohol (and any vinyl ether taken into solution with it from the solvent) were readily obtainable, and if the solvent itself were readily recoverable after use to be used again.

It has now been found that solvents to satisfy the above requirements can be prepared in the form of highly concentrated aqueous solutions of the salts of alkali metals with phenol itself or the lower alkylphenols.

According to the present invention, therefore, in the preparation of a vinyl ether by vinylating an alcohol of the $C_4$—$C_8$ range, the step of reducing the alcohol content of a mixture containing the vinyl ether and its corresponding alcohol comprises treating the mixture with an aqueous solution of an alkali metal phenate, cresylate or xylenate, said solution containing at least 20% by weight of the alkali metal salt, to form a solution of the alcohol therein, and subsequently separating the alcohol solution so formed.

The operative concentration of the salt in the aqueous solution should be at least 2N and preferably 4N or 5N where such concentrated solutions can be obtained.

It may be advantageous in the preparation of the solvent to use an excess of up to 20% alkali hydroxide over that required stoichiometrically for the phenol taken. Such excess of caustic soda can facilitate some of the subsequent recovery operations without impeding the solvent properties of the solution.

The mixture treated may be the crude product obtained on vinylation but it is preferable to distill such crude product to obtain a mixture of vinyl ether and alcohol having a vinyl ether content substantially equal to that corresponding to the azeotrope and then to treat such mixture with the solvent.

The purification procedure can be carried out as a batch process in which the solvent and mixture of vinyl ether and alcohol are agitated together, the lower (aqueous) layer removed, and the upper (vinyl ether) layer treated with a quantity of fresh solvent, and the process repeated until the desired degree of removal of alcohol has been achieved. It may then be advantageous to wash the purified vinyl ether with water, to remove the small amount of salts that may have become dissolved or suspended in the vinyl ether, and then to submit it to a final drying. Such drying can be carried out with any common drying agent with the exception of such drying agents as might give rise to acidity, since these might cause polymerisation of the vinyl ether. An example of a suitable drying agent is solid potassium hydroxide. Alternatively, the drying can be achieved by the partial distillation of the vinyl ether, since the water contained will be entrained with the first portions of the distillate, from which it can be readily separated. Such a drying process could also be readily adapted to operate continuously.

Removal of the alcohol from the mixtures of the vinyl ether and alcohol by the process of the present invention can also be effected by using any of the continuous processes of extraction in general use. Thus the solvent can be fed continuously near to the top of a tower containing packing material, such as Raschig rings, and the mixture fed continuously somewhere near to the bottom of the same tower. Solvent charged with alcohol, and a smaller amount of vinyl ether, is continuously withdrawn from the bottom of the tower, and its alcohol and vinyl ether content recovered by distillation. Purified vinyl ether is continuously withdrawn from the top of the tower, and it may then if desired be submitted to washing with water and drying in the manner outlined above. In operating such a countercurrent scrubbing unit, it has been found to be highly advantageous to employ a small amount of a surface-active agent, such as an alkyl aryl sulphate, a long chain alkyl sulphate, an alkaryl polyglycol ether, or the like. This material assists the wetting of the packing by the solvent and the mixing of the solvent and the vinyl ether; it is of course essential that the amount of such agent used be limited and controlled, so that emulsification of the two phases with consequent difficulties in separation be avoided.

In the recovery of the alcohol removed and any of the vinyl ether accompanying it, the spent solvent is distilled, giving a distillate in two layers of which the upper layer is the desired mixture of alcohol and vinyl ether. This layer is returned to the crude vinylation product feed to the azeotrope still or, where the crude product is treated directly with the solvent, to the crude vinylation product feed to the purification stage. The lower layer consists substantially of water, and it is continuously returned to the still. If the solvent converned be almost saturated sodium phenate, very little phenol passes into the distillate during this recovery process, but such quantity of phenol can be further reduced to virtually negligible proportions, by using in the preparation of the original solvent an excess of caustic soda over that required stoichiometrically for the phenol taken. The excess caustic soda does not impair the solvent properties of the resultant solution. A suitable range for such excess is 5–20%; more can be used but this would afford no advantage.

The invention is illustrated by the following examples. In all cases the initial mixture of vinyl ether and alcohol contained small amounts of non-alcoholic impurities which were not removed by the solvent treatment.

*Example 1*

100 g. of mixture of isoamyl vinyl ether and isoamyl alcohol containing 87.9% of the vinyl ether was shaken three times successively with batches each of 100 g. of 4N aqueous sodium phenate. The product was washed successively with small amounts of 5% aqueous caustic soda and water and then distilled. The distillate consisted of a mixture containing 95.0% of isoamyl vinyl ether, the remainder consisting chiefly of non-alcoholic impurities.

*Example 2*

1000 g. of a mixture of isoamyl vinyl ether and isoamyl alcohol containing 87.7% of the ether was shaken four times successively with equal weights of 5N aqueous sodium phenate, using 1000 g. each time. It was then shaken twice with small amounts of 5% aqueous caustic soda, and distilled. 838 g. of a product containing 98.9% of vinyl ether was obtained. The sodium phenate solutions were combined and distilled in steam, affording 134 g. of a mixture of vinyl ether and isoamyl alcohol, containing 43% of vinyl ether.

*Example 3*

To the bottom of a column packed with porcelain beads was fed 5253 g. of a mixture of isoamyl vinyl ether and isoamyl alcohol containing 82.0% of the ether, and at the same time 6.04 liters of 5N aqueous sodium phenate, to which had been added 0.6% of "Teepol" solution (believed to contain about 18% of active agent) was fed to the top of the column. The vinyl ether coming from the top of the column was then passed through a second column counter-current to 9 liters of water containing 0.6% of "Teepol" solution. The purified vinyl ether was then distilled, and the first runnings of the distillate separated into two layers, of which the lower (aqueous) layer was rejected. 3885 g. of isoamyl vinyl ether of 98.1% purity was obtained. The aqueous sodium phenate liquor was distilled in steam, and gave 1368 g. of a mixture containing 35.8% of vinyl ether.

*Example 4*

A mixture of isoamyl vinyl ether and isoamyl alcohol containing 80.2% of isoamyl vinyl ether was shaken three times successively with equal weights of 5N aqueous potassium phenate. The vinyl ether was then washed with water and distilled. The distillate contained 96.8% of vinyl ether.

*Example 5*

154 g. of a mixture of isoamyl vinyl ether and isoamyl alcohol containing 81.3% of isoamyl vinyl ether was shaken twice successively with batches of its own weight of 5N aqueous sodium cresylate. It was then washed with water, and distilled. 111 g. of a product containing 98.2% of the vinyl ether were obtained. Steam distillation of the solvent gave 37 g. of a mixture containing 37.7% of vinyl ether.

*Example 6*

"Shirlacrol" (a coal tar fraction consisting mainly of xylenols) was dissolved in aqueous caustic soda to give a 3N solution. 100 g. of this solution was shaken with 102 g. of a mixture of isoamyl vinyl ether and isoamyl alcohol containing 83.7% of isoamyl vinyl other. 64 g. of a product was obtained containing 95.3% of vinyl ether.

*Example 7*

862 g. of a mixture of n-butyl vinyl ether and n-butyl alcohol, containing 90% of the ether, was shaken four times successively with its own weight of 5N aqueous sodium phenate. The product was washed with 5% aqueous caustic soda, and then with water, and then distilled. 626 g. of a product containing 99.1% of n-butyl vinyl ether was obtained. Recovery of vinyl ether from the phenate solution gave 128 g. of a mixture containing 76.4% of vinyl ether.

*Example 8*

636 g. of a mixture of 2-ethylbutanol and 2-ethylbutyl vinyl ether containing 85.6% of vinyl ether was treated four times successively with its own weight of 5N aqueous sodium phenate. After treatment, as in previous examples, 367 g. of a product containing 97.6% of the vinyl ether was obtained, and 114 g. of a product containing 46% of the vinyl ether.

*Example 9*

166 g. of a mixture of 2-ethylbutanol and 2-ethylbutyl vinyl ether containing 75.2% of the vinyl ether was fed up a packed column countercurrent to 5N aqueous sodium phenate. After further treatment, as in previous examples, 129 g. of a product containing 96.9% of the vinyl ether was obtained.

I claim:

1. In the preparation of a vinyl ether by vinylating an alcohol of the $C_4$–$C_8$ range, the step of reducing the alcohol content of a mixture containing the vinyl ether and its corresponding alcohol by treating the mixture with a scrubbing solvent consisting essentially of an aqueous solution of a salt selected from the group consisting of alkali metal phenates, cresylates, and xylenates, said solution containing at least 20% by weight of the alkali metal salt, to form a solution of the alcohol therein, and subsequently separating the alcohol solution so formed.

2. Process according to claim 1 wherein the operative concentration of the salt in the aqueous solution is at least 4N.

3. Process according to claim 1 wherein the aqueous solution contains up to 20% excess of alkali metal hydroxide over that required stoichiometrically for the phenol present.

4. Process according to claim 1 wherein the mixture of vinyl ether and alcohol has a vinyl ether content substantially equal to that corresponding to the azeotrope.

5. Process according to claim 1 wherein the process is carried out batchwise.

6. Process according to claim 1 wherein the process is carried out continuously.

7. Process according to claim 1 wherein up to 2% of a surface-active agent is added to the scrubbing solvent.

LEO PHILIPP ELLINGER.

References Cited in the file of this patent

UNITED STATES PATENTS

| Number | Name | Date |
|---|---|---|
| 2,081,721 | Van Dijck et al. | May 25, 1937 |
| 2,121,019 | Christiansen et al. | June 21, 1938 |
| 2,315,132 | Bemmann | Mar. 30, 1943 |
| 2,546,431 | Collardeau et al. | Mar. 27, 1951 |